UNITED STATES PATENT OFFICE.

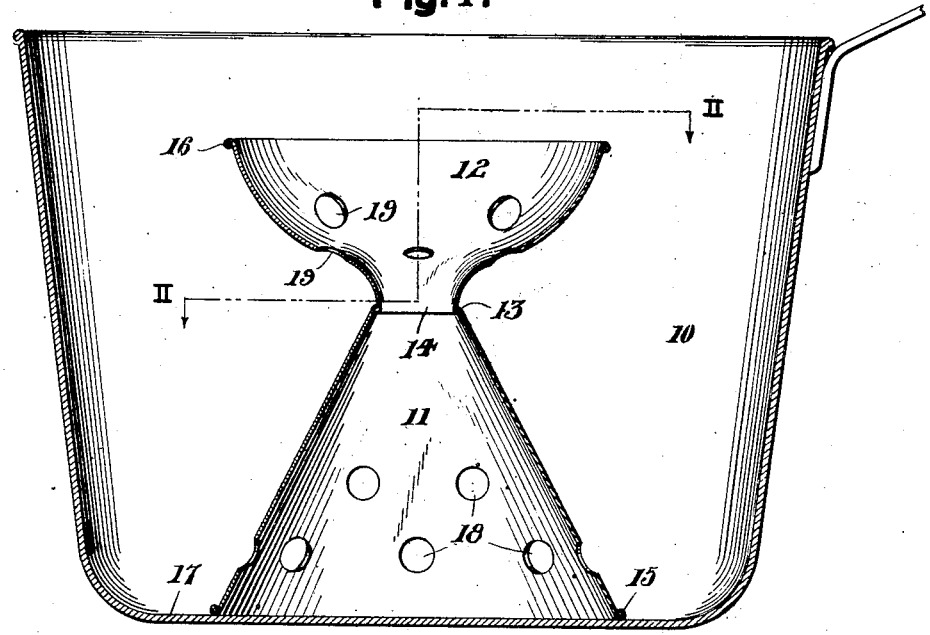
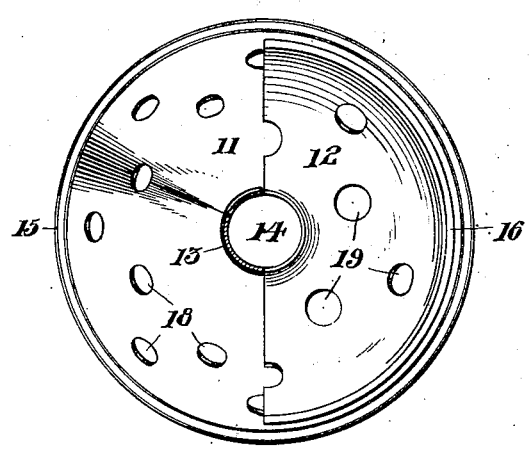

JOHN PELUCHA, OF NEWARK, NEW JERSEY.

MILK-BOILER.

1,213,404.  Specification of Letters Patent.  Patented Jan. 23, 1917.

Application filed September 20, 1915. Serial No. 51,614.

*To all whom it may concern:*

Be it known that I, JOHN PELUCHA, subject of the King of Hungary, residing at Newark, in the county of Essex and State of New Jersey, have invented certain new and useful Improvements in Milk-Boilers, of which the following is a specification.

This invention relates to certain new and useful improvements in milk boilers.

The primary object of the invention is the provision of a simple inexpensive device adapted for positioning within a milk holding receptacle and whereby the milk is centralized during the heating operation and the boiling thereof reduced to a minimum, as well as the boiling-over of the fluid prevented.

With these general objects in view and others that will appear as the nature of the invention is better understood, the same consists in the novel combination and arrangement of parts hereinafter more fully described, illustrated in the accompanying drawings, and pointed out in the appended claim.

In the drawings forming a part of this application and in which like-designating characters refer to corresponding parts throughout the several views:—Figure 1 is a central transverse sectional view of the device positioned in a fluid-heater. Fig. 2 is a sectional view of the device taken upon line II—II of Fig. 1.

Referring more in detail to the accompanying drawings, the present device is herein illustrated in connection with a receptacle or pan 10 adapted to contain fluid such as milk which it is desired to heat by the positioning of the pan over a heater or stove. The device is preferably formed of sheet metal either pressed into shape or otherwise manufactured and consists of a hollow frusto-conical base 11 and a bowl 12. The device is usually formed of two members 11 and 12 which are permanently secured together by a substantially central annular bead 13, thus connecting the top of the base member 11 with the bottom of the bowl member 12, it being understood that a central contracted passage 14 is provided in the bottom of the cup 12 and communicating with the interior of the base 11. The entire device thus formed is somewhat hour-glass shape having opposite open ends.

The opposite enlarged ends of the base and bowl are provided with rolled-over beaded edges 15 and 16 respectively, it being understood that the entire device is seated upon the bottom 17 of the pan 10 upon the said base bead 15. Perforations 18 are arranged through the base 11 below the central point of the base, while the bowl 12 is provided with similar perforations 19 therethrough.

From this detailed description of the device it will be noted that with the same positioned in the pan 12 in the manner illustrated in Fig. 1 the milk or other fluid within the said pan which is preferably positioned to a height substantially at the top of the base perforations 18 will upon being considerably heated start to boil at the center of the fluid within the pan which by reason of the position of the present device will be within the frusto-conical base 11. The boiling of the fluid will allow the same to become centralized by the said base and the fluid will thus pass upwardly into the bowl 12 and thus be circulated and returned to the fluid within the pan through the bowl openings 19. The side walls of the bowl member 12 are continuously curved so as to position some of the openings 19 whereby the quick return of the boiling fluid to the receptacle 10 is assured. By providing continuously curved sides, the liquid will be returned from the bowl to the receptacle 10 when the receptacle is removed from the heater, and by this construction no cavities are present for retaining small quantities of the fluid. It will be plainly seen that a completely sanitary device is provided and one which will accomplish the objects herein enumerated.

The present form of the invention therefore provides a device readily positioned within a heating receptacle for fluid, the device being readily removed and easily cleaned, while the circulation afforded thereby for the fluid not only reduces the boiling, but prevents the milk from boiling over the edge of the receptacle or pan 10.

While the form of the invention herein shown and described is what is believed to be the preferred embodiment thereof, it is nevertheless to be understood that minor changes may be made without departing from the spirit and scope of the invention as claimed.

What I claim as new is:—

A milk boiler attachment comprising a hollow frusto-conical base open at both ends and provided with a plurality of perforations adjacent the enlarged end thereof, a bowl-shaped top member having a contracted bottom inseparably secured to the upper end of the said base and provided with a communicating passage between the said top and base, the said bowl-shaped top being provided with a plurality of perforations therethrough and having continuously curved sides.

In testimony whereof I affix my signature.

JOHN PELUCHA.

Copies of this patent may be obtained for five cents each, by addressing the "Commissioner of Patents, Washington, D. C."